(12) United States Patent
Chayka

(10) Patent No.: US 6,291,044 B1
(45) Date of Patent: Sep. 18, 2001

(54) PACKAGING TAPE

(76) Inventor: John M. Chayka, 1939 Vianne, Rochester Hills, MI (US) 48309

( * ) Notice: Subject to any disclaimer, the term of this patent is extended or adjusted under 35 U.S.C. 154(b) by 0 days.

(21) Appl. No.: 09/377,459

(22) Filed: Aug. 19, 1999

Related U.S. Application Data

(63) Continuation-in-part of application No. 08/868,958, filed on Jun. 4, 1997, now abandoned, which is a continuation-in-part of application No. 08/567,225, filed on Dec. 5, 1995, now abandoned.

(51) Int. Cl.⁷ ............................................. B32B 7/12
(52) U.S. Cl. .................... 428/40.1; 40/638; 428/41.9; 428/42.1; 428/192; 428/194
(58) Field of Search ................... 428/40.1, 41.9, 428/42.1, 192, 194; 40/638

(56) References Cited

U.S. PATENT DOCUMENTS

| | | | |
|---|---|---|---|
| 1,827,636 | 10/1931 | Ames | 428/343 |
| 2,307,406 | 1/1943 | Howard | 428/343 |
| 2,350,185 | 5/1944 | Pero | 428/194 |
| 2,565,509 | 8/1951 | Marcin | 428/343 |
| 2,599,410 | 6/1952 | Probst | 428/194 |
| 2,703,764 | 3/1955 | Vogt | 428/343 |
| 2,721,810 | 10/1955 | Schram | 428/354 |
| 3,464,842 | 9/1969 | Jackstadt | 428/343 |
| 4,041,202 | 8/1977 | Williams | 428/138 |
| 4,570,627 | * 2/1986 | MacConkey | 128/155 |
| 4,582,737 | 4/1986 | Torderson | 428/57 |
| 4,770,913 | 9/1988 | Yamamoto | 428/40 |
| 4,929,486 | 5/1990 | Itou | 428/77 |
| 5,098,786 | 3/1992 | Hanke | 428/343 |
| 5,149,587 | 9/1992 | Hill | 428/354 |
| 5,306,376 | 4/1994 | James | 428/343 |
| 5,340,629 | 8/1994 | Rodighiero | 428/40 |
| 5,354,614 | 10/1994 | Cox | 428/343 |
| 5,401,547 | 3/1995 | Blackwell | 428/194 |
| 5,466,501 | 11/1995 | Logan | 428/40 |
| 5,468,533 | 11/1995 | Lipson | 428/40 |
| 6,117,262 | 9/2000 | Moulds et al. | 156/212 |

* cited by examiner

Primary Examiner—Nasser Ahmad
(74) Attorney, Agent, or Firm—Laurence C. Begin; Dinnin & Dunn P.C.

(57) ABSTRACT

A tape for sealing a package has a layer of adhesive on one side thereof with an adhesive attenuator superimposed along one edge portion thereof. The tape is initially bondable to the package in its entirety but the edge portion is relatively easily severable from the package to facilitate stripping of the entire tape from said package.

1 Claim, 1 Drawing Sheet

PACKAGING TAPE

This application is a continuation-in-part of my application, Ser. No. 08/868,958 filed Jun. 4, 1997 now abandoned and is also a continuation-in-part of my application, Ser. No. 08/567,225 filed Dec. 5, 1995 now abandoned.

BACKGROUND OF THE INVENTION

The invention relates to packaging tape that can be easily and conveniently removed from a package to facilitate opening of the package.

Modern plastic film tapes exhibit significant tensile strength and holding power. While this attribute insures package integrity, it often presents a problem when the package must be opened. Often a knife is required to be inserted between panels of the package and thereafter drawn between the panels to slit the tape. Unfortunately, this opening procedure often damages the goods internally of the package.

The aforesaid problem was recognized heretofore by C. H. Ames who discloses a solution to the problem in U.S. Pat. No. 1,827,636. Ames provides a sealing tape having an adhesive along only the outer edges thereof leaving a non-adhesive strip down the center of the tape. A tab is provided at one end of the sealing tape in the center portion thereof to facilitate removal of the tape from the package. The solution presented by Ames is not totally acceptable, however, since the non-adhesive tab at one end of the tape is subject to being caught by other packages or objects resulting in stripping of the tape from the package. Moreover, the strength of the tape is compromised by the lack of adhesive at a critical area thereof, namely, the area that overlies the space between adjacent flaps or edge portions of a package.

Yet another solution to the problem of opening a tape sealed package without tools is offered by Vogt, U.S. Pat. No. 2,703,764. However, Vogt solves this problem by weakening a portion of the tape to effect rupture thereof and facilitate subsequent removal of the tape from the package. Obviously, integrity of a package is compromised by an easily rupturable tape.

SUMMARY OF THE INVENTION

The aforesaid problem is solved, in accordance with a preferred constructed embodiment of the present invention, by a novel packaging tape, one entire surface of which is capable of being secured to a package but that can be quickly separated therefrom without the use of a knife or other tool.

In its preferred form, the invention comprises a packaging tape made from, for example, a strip of polypropylene film. An adhesive, for example, an acrylic or rubber based adhesive is applied to one side of the tape. The adhesive is applied to only the surface of the film and is of a chemical makeup that does not etch or penetrate the film thereby maintaining the full structural integrity of the film. The holding power of the adhesive along one longitudinal edge of the tape is reduced by coating the adhesive on one edge portion thereof with an adhesive attenuator. The attenuated adhesive facilitates lifting of the edge portion of the tape from the package thereby to facilitate removal of the entire tape from the package. Thus, the relatively simple procedure enabled by the present invention obviates the need for cutting of the tape by a knife or other tool to effect opening of the package.

DETAILED DESCRIPTION OF THE PREFERRED EMBODIMENT(S)

Figure 1:
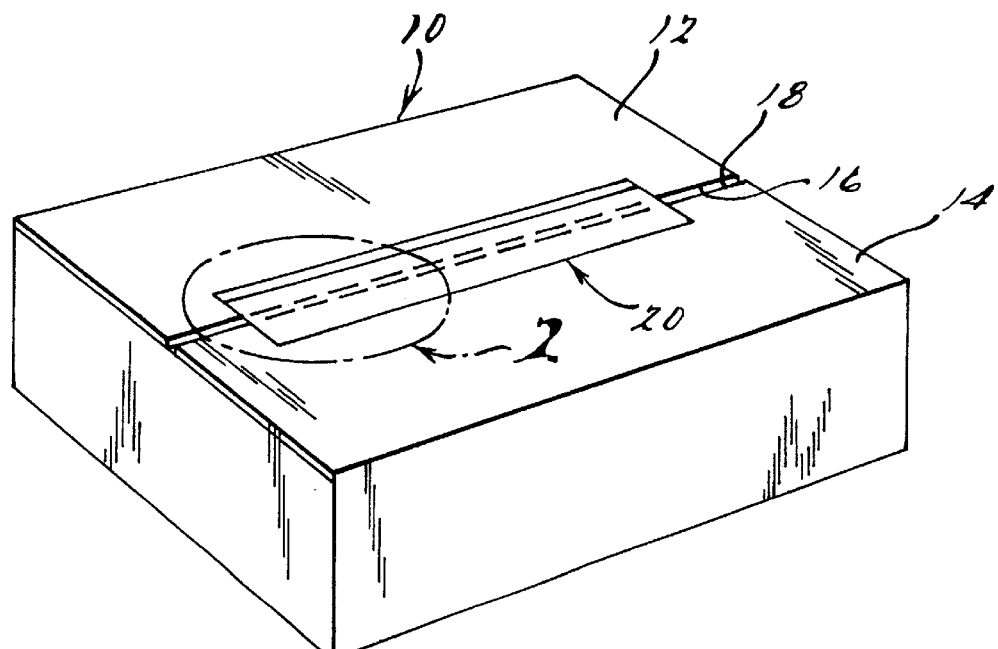
FIG. 1 is a perspective view of a package having the sealing tape of the present invention applied thereto.
Figure 2:
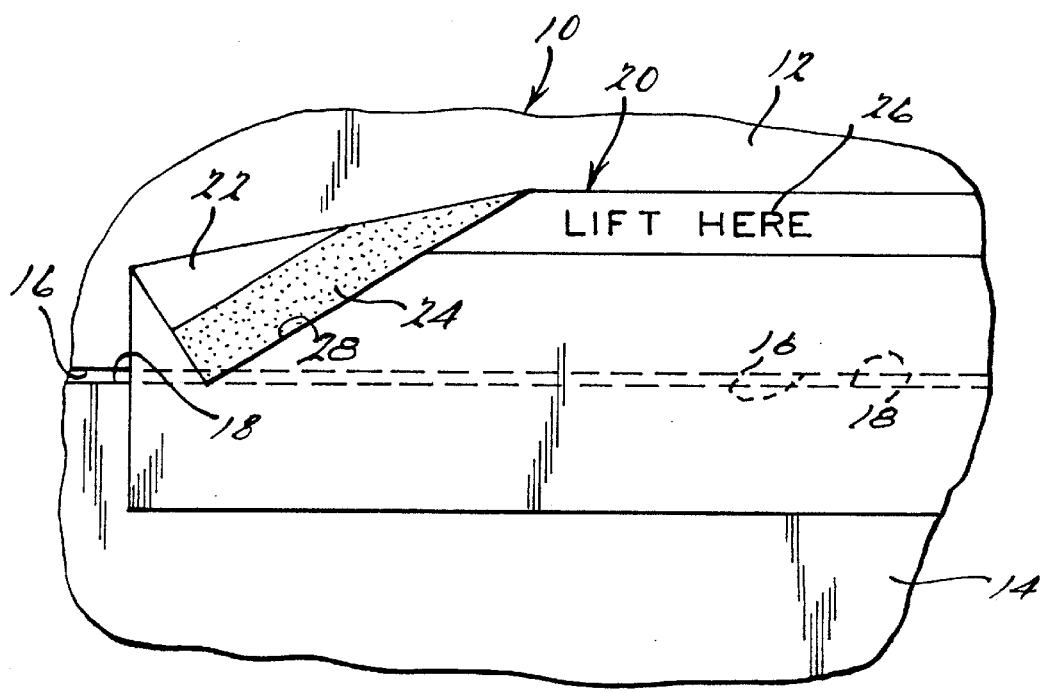
FIG. 2 is a view taken within the circle "2" of FIG. 1, with the tape partially peeled away from the package.

Referring to the drawings, a package 10 has a pair of flaps 12 and 14 having edge portions 16 and 18, respectively, disposed in juxtaposed relation. The flaps 12 and 14 are joined to one another and the package 10 sealed by a sealing tape 20, for example polypropylene film two inches wide having an adhesive on a lower surface 22 thereof. The tape 20 is applied so as to overlap the edge portions 16 and 18 of the flaps 12 and 14, respectively. The adhesive used in the preferred constructed embodiment of the invention is a conventional acrylic adhesive that does not chemically etch, attach or otherwise comprise the structural integrity of the tape 20.

In accordance with the present invention, the holding power of the adhesive on an edge portion 24 of the lower surface 22 the tape 20 is attenuated by applying a colored vinyl based ink that has been mixed with methyl ethyl ketone. In a constructed embodiment of the invention, the edge portion 24 having the attenuated adhesive thereon is one-half (½) inch wide. The ink serves to attenuate the holding power of the adhesive on the one-half (½) inch wide edge portion 24 thereby facilitating lifting of the edge portion 24 to get a grip on the tape 20. If desired, the process of applying colored ink to the edge portion 24 of the adhesive on the lower surface 22 of the tape 20 can be utilized to create indicia 26 on the tape 20 by simply masking a central portion of the edge portion 24 with the desired indicia incident to the application of the colored ink. It is to be noted however, that when the aforesaid method of applying indicia is utilized, an uninterrupted outer peripheral edge 28 of the tape 20 contains attenuated adhesive so as to preclude spurious lifting of the tape 20 due to, for example scuffing, yet accommodate manual stripping of the tape 20. Alternatively, the indicia 26 can be provided by applying the indicia to the top surface of the tape 20.

Removal of the tape 20 from the package 10 is initiated by grasping the edge portion 24 of the tape as by pinching, thence pulling the tape 20 away from the package 10. After the edge portion 24 of the tape 20 is lifted from the package 10, the tape 20 is easily stripped from the package 10 in its entirety, obviating the requirement for slitting of the tape 20 or application of a tool to the package 10.

It is to be noted that the ability of the tape to be stripped from a package in one piece is enhanced by the fact that its tensile strength, as well as other physical characteristics, is not in any way affected by either the adhesive or adhesive attenuating ink.

While the sealing tape 20 is shown applied to the package 10 having juxtaposed flaps 12 and 14, it should be evident that the tape 20 is equally applicable to seal conventional fiber board boxes and other containers having overlapping edges.

While the preferred embodiment of the invention has been disclosed, it should be appreciated that the invention is susceptible of modification without departing from the scope of the following claims.

I claim:
1. A sealing tape comprising:

an elongated strip of flexible plastic film;

a layer of adhesive having a first holding power disposed over the entire surface of one side of said strip of film without impairing the physical characteristics of the film; and a continuous relatively narrow coating of adhesive attenuator superimposed over said adhesive adjacent one edge portion of said strip of film for reducing the holding power of said adhesive on said one edge portion to a second relatively lower holding power without impairing the physical characteristics of said film wherein said continuous relatively narrow coating of adhesive attenuator superimposed over said one edge portion forms an attenuated adhesive portion whereby the entire surface of said tape is initially bondable to a receiving surface upon application of the tape to the receiving surface but said one edge portion of the tape is relatively easily severable from the receiving surface to facilitate stripping of the entire tape without rupture thereof from the receiving surface.

* * * * *